Patented Dec. 19, 1950

2,534,647

UNITED STATES PATENT OFFICE 2,534,647

SINGLE BATH CHROME DYEING PROCESS USING AZO DYES HAVING NAPHTHOL-SULFONAMIDE GROUPS

Willy Widmer, Bottmingen, Alphonse Heckendorn, Basel, and Emil Mannhart, Riehen, Switzerland, assignors to Ciba Limited, Basel, Switzerland, a Swiss firm No Drawing. Application September 6, 1949, Serial No. 114,291. In Switzerland September 29, 1948

7 Claims. (Cl. 8—42)

This application is a continuation-in-part of our copending application Serial No. 105,064, filed July 15, 1949.

According to this invention fast dyeings are produced with monoazo-dyestuffs which are free from carboxylic acid and sulfonic acid groups and correspond to the general formula

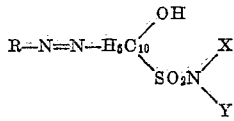

in which R represents an aromatic radical of the benzene series which contains a hydroxyl group in ortho-position to the azo linkage, in which the radical

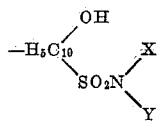

represents the radical of a 2-hydroxynaphthalene sulfonic acid amide bound in the 1-position to the azo linkage, and in which X and Y each represent a hydrogen atom or an alkyl or hydroxalkyl group and together contain not more than 8 carbon atoms, by conducting the dyeing by the single bath chroming process with a solution containing the dyestuff and an agent yielding chromium.

The monoazo-dyestuffs used in the present invention, and of which some are known, may be prepared, for example, by coupling an ortho-hydroxy-diazo-compound of the benzene series with a 2-hydroxynaphthalene sulfonic acid amide of the general formula

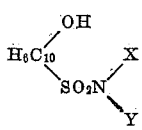

in which X and Y each represent a hydrogen atom or an alkyl or hydroxyalkyl group and together contain not more than 8 carbon atoms.

The ortho-hydroxy-diazo-compounds of the benzene series serving as starting materials and obtainable from the corresponding amines may contain a wide variety of further substituents with the exception of carboxylic acid and sulfonic acid groups. As such substituents there may be mentioned, for example, alkyl groups such as ethyl or methyl groups, alkoxy groups such as ethoxy or methoxy groups, acylamino groups such as acetylamino groups, or halogen atoms such as bromine and especially chlorine atoms. Especially valuable dyestuffs are obtained from ortho - hydroxy - diazo - compounds containing nitro groups, and above all from diazotised 4- or 5-nitro-2-amino-1-hydroxybenzene or diazotised 4-chloro-5-nitro-2-amino-1-hydroxybenzene.

As examples of such ortho-hydroxy-diazo-compounds of the benzene series there may be mentioned those obtained from the following amines:

4 - methyl - 2 - amino-1-hydroxybenzene, 4-chloro-2-amino-1-hydroxybenzene, 2-amino-1-hydroxybenzene - 4 - sulfonic acid N-isopropylamide, 3-, 4-, 5- or 6-nitro-2-amino-1-hydroxybenzene, 4:6-dinitro-2-amino-1-hydroxybenzene, 4 - nitro - 6 - acetylamino-2-amino-1-hydroxybenzene, 5-nitro- or 6-nitro-4-methyl-2-amino-1-hydroxybenzene, 4-chloro-5-nitro- or 6-nitro-2-amino-1-hydroxybenzene, 6-chloro-4-nitro-2-amino-1-hydroxybenzene and 4-chloro-6-acetyl-amino-2-amino-1-hydroxybenzene.

In the 2-hydroxynaphthalene sulfonic acid amides also used as starting materials for preparing the monoazodyestuffs the sulfonic acid amide group may be present in the 3-, 4-, 5-, 6- or 7-position.

Especially valuable dyestuffs are obtained from 2-hydroxynaphthalene sulfonic acid amides in which the sulfonic acid amide group occupies one of the β-positions of the six-membered ring of the naphthalene nucleus which does not contain the hydroxyl group, for example, from 2-hydroxynaphthalene-7-sulfonic acid amides and especially from 2 - hydroxynaphthalene-6-sulfonic acid amides.

The hydroxynaphthalene sulfonic acid amides contain the group

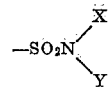

in which X and Y have the meanings given above. The symbols X and Y may represent unbranched or, if desired, branched alkyl or hydroxyalkyl groups or hydrogen atoms. X and Y may be identical or different from one another and may be united to form a ring. There come into consideration, for example, hydroxynaphthalene sulfonic acid amides in which the

group may be any one of the following groups:

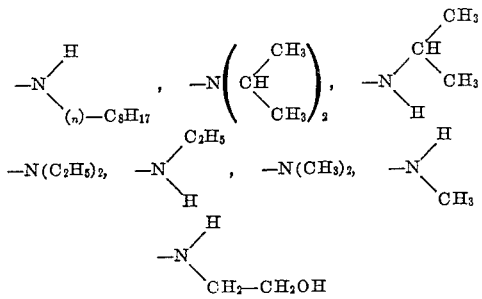

but especially —NH₂.

Such hydroxynaphthalene sulfonic acid amides are in part known. They can generally be prepared by methods in themselves known, for example, by subjecting the appropriate 2-hydroxynaphthalene sulfonic acid to the action of an acylating agent, such as para-toluene sulfonyl chloride, to produce an ester of the hydroxynaphthalene sulfonic acid, treating the latter with a phosphorus chloride, such as phosphorus pentachloride, to convert the —SO₃H group into an —SO₂Cl group, then reacting the resulting sulfonyl chloride with ammonia or an amine of the formula

and finally hydrolysing the ester by the action of an alkali.

The 2 - hydroxynapthalene - 6 - sulfonic acid amides can also be prepared by reacting with ammonia or an amine of the formula

2 - hydroxynaphthalene-1-carboxylic acid-6-sulphonyl chloride obtainable from 2-hydroxynaphthalene-1-carboxylic acid by the action of chlorosulfonic acid, and heating the product in a weakly alkaline medium to split off the very mobile carboxyl group in the 1-position of the naphthalene ring.

As examples of hydroxynaphthalene sulfonic acid amides with which valuable dyestuffs for use in the process of this invention can be made, there may be mentoined: 2-hydroxynaphthalene-4-sulfonic acid amide, 2-hydroxynaphthalene-4-sulfonic acid N-isopropylamide, 2-hydroxynaphthalene-7-sulfonic acid amide, 2-hydroxynaphthalene - 7 - sulfonic acid N-dibutylamide, 2-hydroxynaphthalene - 6 - sulfonic acid-N-n-octylamide, 2-hydroxynaphthalene - 6 - sulfonic acid N-β-hydroxyethylamide, 2-hydroxynaphthalene-6-sulfonic acid N-dimethylamide, 2-hydroxynaphthalene-6-sulfonic acid N-methylamide and 2-hydroxynaphthalene - 6 - sulfonic acid N-isopropylamide. 2-hydroxynaphthalene-6-sulfonic acid amide is especially valuable.

The ortho-hydroxy-diazo-compounds of the benzene series are advantageously coupled in an alkaline medium with the hydroxynaphthalene sulfonic acid amides. For example, the hydroxynaphthalene sulfonic acid amide may be dissolved in the necessary quantity of a solution of an alkali hydroxide, and then alkali carbonate added and the diazo-compound added to the resulting solution.

In accordance with the present invention the dyeing is conducted by the single bath chroming process with a solution containing both the dyestuff and an agent yielding chromium. As agents yielding chromium there are used preferably compounds of hexa-valent chromium. A dyeing process of this kind is, for example, that in which there is used a solution containing the dyestuff and also an alkali chromate, for example, sodium chromate or potassium chromate and an ammonium salt of strong mineral acid, such as ammonium chloride or preferably ammonium sulfate.

By the process of this invention there are obtained especially on wool, but also on artificial fibers of superpolyamides or superpolyurethanes, very valuable dyeings which are in general distinguished by very good properties of wet fastness and above all by a very good to excellent fastness to light. Especially valuable, for example, navy blue to black, tints can be produced by this invention with those dyestuffs which contain in the radical of the diazo-component a nitro group.

In some cases very valuable tints are obtained by the process of this invention from mixtures of two or more dyestuffs of the kind defined above. Such mixtures can be obtained either by mixing the individual dyestuffs or, in the case, for example, of dyestuffs derived from the same coupling components and different diazo-components, by diazotising a mixture of the different amines and/or by simultaneously coupling the different diazo-compounds with the coupling components.

The following example illustrates the invention, the parts and percentages being by weight:

A dyebath is prepared with 4000 parts of water, 2 parts of potassium chromate, 2 parts of ammonium sulfate, 10 parts of crystalline sodium sulfate and 4 parts of the dyestuff obtainable by coupling diazotised 5-nitro-4-chloro-2-amino-1-hydroxybenzene with 2-hydroxynaphthalene-6-sulfonic acid amide. 100 parts of well wetted wool are entered into the dyebath at 60° C., the temperature is raised to the boil in the course of 30 minutes, and boiling is continued for 45 minutes. There are then added 0.5 part of acetic acid of 40 per cent. strength and boiling is continued for a further 45 minutes. The wool is dyed a fast navy blue tint.

The new dyestuff used in this example may be prepared as follows:

22.3 parts of 2-hydroxynaphthalene-6-sulfonic acid amide are dissolved in 200 parts of water and 11.2 parts of potassium hydroxide and coupled in the presence of 20 parts of sodium carbonate at 0° C. with the diazo-compound obtained in the usual manner from 19 parts of 5-nitro - 2 - chloro - 2 - amino-1-hydroxybenzene. Coupling sets in immediately and is complete in 4 hours. The dyestuff formed is isolated by filtration, washed with dilute sodium chloride solution and dried. There is obtained a black powder which dissolves in hot water with a blue-violet coloration and in concentrated sulfuric acid with a red coloration.

In the following table is a list of other dyestuffs which also yield valuable dyeings of very good properties of fastness by the process described in this example:

| Dyestuff from— | | Tint of the (dyeing) |
|---|---|---|
| Diazo-component | Coupling component | |
| 5-Nitro-2-amino-1-hydroxybenzene | 2-Hydroxynaphthalene-6-sulfonic acid amide | bluish black. |
| 4:6-Dinitro-2-amino-1-hydroxybenzene | ____do____ | reddish black. |
| 4-Nitro-2-amino-1-hydroxybenzene | ____do____ | black. |
| 6-Chloro-4-nitro-2-amino-1-hydroxybenzene | ____do____ | dark brown. |
| 6-Nitro-4-chloro-2-amino-1-hydroxybenzene | ____do____ | reddish black. |
| 5-Nitro-2-amino-1-hydroxybenzene | 2-Hydroxynaphthalene-6-sulfonic acid methylamide. | black. |
| 4-Nitro-2-amino-1-hydroxybenzene | 2-Hydroxynaphthalene-6-sulfonic acid dimethylamide. | reddish black. |
| Do | 2-Hydroxynaphthalene-6-sulfonic acid β-hydroxyethylamide. | black. |
| 6-Chloro-4-nitro-2-amino-1-hydroxybenzene | ____do____ | dark-brown-black. |
| 5-Nitro-4-chloro-2-amino-1-hydroxybenzene | 2-Hydroxynaphthalene-7-sulfonic acid amide | greenish navy blue. |
| 4-Nitro-2-amino-1-hydroxybenzene | ____do____ | black. |
| Do | 2-Hydroxynaphthalene-4-sulfonic acid amide | dark black-brown. |

A very valuable deep black dyeing is obtained by using in the manner described in the first paragraph of this example, instead of 4 parts of the dyestuff specified, a mixture consisting of 3 parts of the dyestuff from diazotised 5-nitro-2-amino-1-hydroxybenzene and 2-hydroxynaphthalene-6-sulfonic acid amide and 1 part of the dyestuff from diazotised 4-nitro-2-amino-1-hydroxybenzene and 2-hydroxynaphthalene-6-sulfonic acid amide.

What we claim is:

1. A process for producing fast dyeings, which comprises conducting the dyeing by the single bath chroming process with a solution containing an agent yielding chromium and a monoazo-dyestuff which is free from carboxylic acid and sulfonic acid groups and corresponds to the general formula

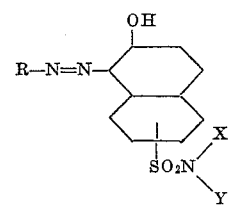

in which R represents an aromatic radical of the benzene series which contains a hydroxyl group in ortho-position to the azo linkage, in which the radical

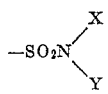

occupies one of the β-positions of the six-membered ring of the naphthalene nucleus which does not contain the hydroxyl group, and in which X and Y each represents a member of the group consisting of a hydrogen atom, an alkyl group and a hydroxyalkyl group and together contain not more than 8 carbon atoms.

2. A process for producing fast dyeings, which comprises conducting the dyeing by the single bath chroming process with a solution containing an agent yielding chromium and a monoazo-dyestuff which is free from carboxylic acid and sulfonic acid groups and corresponds to the formula

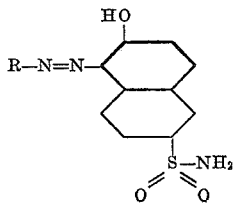

in which R represents an aromatic radical of the benzene series which contains a hydroxyl group in ortho-position to the azo linkage.

3. A process for producing fast dyeings, which comprises conducting the dyeing by the single bath chroming process with a solution containing an agent yielding chromium and a monoazo-dyestuff which is free from carboxylic acid and sulfonic acid groups and corresponds to the formula

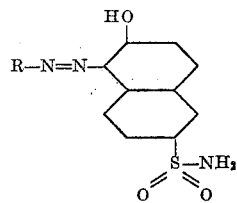

in which R represents an aromatic radical of the benzene series which contains a hydroxyl group in ortho-position to the azo linkage and a nitro group.

4. A process for producing fast dyeings, which comprises conducting the dyeing by the single bath chroming process with a solution containing an agent yielding chromium and the monoazo dyestuff of the formula

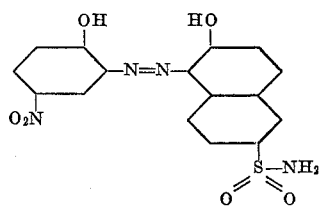

5. A process for producing fast dyeings, which comprises conducting the dyeing by the single bath chroming process with a solution containing an agent yielding chromium and the monoazo dyestuff of the formula 6. A process for producing fast dyeings, which comprises conducting the dyeing by the single bath chroming process with a solution containing an agent yielding chromium and the monoazo dyestuff of the formula

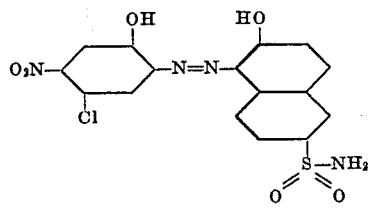

7. A dyebath containing an agent yielding chromium and a monoazo-dyestuff which is free from carboxylic acid and sulfonic acid groups and corresponds to the general formula

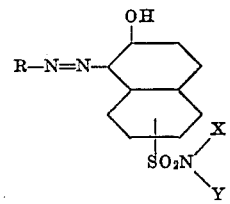

in which R represents an aromatic radical of the benzene series which contains a hydroxyl group in ortho-position to the azo linkage, in which the radical

occupies one of the β-positions of the six-membered ring of the naphthalene nucleus which does not contain the hydroxyl group, and in which X and Y each represents a member of the group consisting of a hydrogen atom, an alkyl group and a hydroxyalkyl group and together contain not more than 8 carbon atoms.

WILLY WIDMER.
ALPHONSE HECKENDORN.
EMIL MANNHART.

REFERENCES CITED

The following references are of record in the file of this patent:

UNITED STATES PATENTS

| Number | Name | Date |
| --- | --- | --- |
| 2,122,127 | Benade | June 28, 1938 |

FOREIGN PATENTS

| Number | Country | Date |
| --- | --- | --- |
| 232,370 | Switzerland | Aug. 16, 1944 |

OTHER REFERENCES

"Theory and Practice of Wool Dyeing," by C. L. Bird, published by Society of Dyers and Colourists, 32/34 Picadilly Bradford, 1947, page 87.